United States Patent Office 2,968,637
Patented Jan. 17, 1961

2,968,637

CURABLE DISPERSIONS OF ETHYLENE POLYMERS AND PROCESS OF CURING SAME

George H. Bowers III, Wilmington, Del., assignor to E. I. du Pont de Nemours and Company, Wilmington, Del., a corporation of Delaware No Drawing. Filed July 20, 1953, Ser. No. 369,244

10 Claims. (Cl. 260—4)

This invention relates to a process for the preparation of dispersions and more particularly relates to dispersions from substantially saturated high molecular weight polymers from monoolefinic compounds containing substituent groups that can be cured.

The substituted saturated high molecular weight polymers from monoolefinic compounds used in the practice of this invention may be prepared in accord with the process as described in the McQueen U.S. Patent 2,212,786, issued August 27, 1940, and the McAlevy U.S. Patent 2,405,971, issued August 20, 1946. Other processes may be used for producing the substituted polymers employed which include, more particularly, the halosulfonated polymers of the monoolefins and more especially such substituted polymers of ethylene. The preparation of stable dispersions of these compounds that can be cured directly from the dispersed composition after removing the dispersing medium is not taught in the prior art nor does that art teach that such stable dispersions exist. Moreover, the processes taught in the art for preparing emulsions and dispersions generally have not been found suitable for use in the preparation of curable dispersions from the aforesaid and related polymers.

An object of the present invention is to provide dispersions and a process for producing high solids content dispersions of substantially saturated high molecular weight polymers from monoolefinic compounds containing substituent groups. Another object is to provide new compositions of matter containing as their major functional ingredient substituted polymers of the monoolefins containing halogen and sulfur groups. Yet another object is to provide curable dispersions of the chlorosulfonated polymers of ethylene. A further object is to provide a process for preparing a high solids content aqueous dispersion of chlorosulfonated polymers of ethylene from organic solutions thereof that are mixed with dispersions of curing agents, the polymers of the composite mixture being curable. Other objects and advantages of the invention will hereinafter appear.

The above and other objects of the invention are realized by the preparation of a dispersion of the chlorosulfonated hydrocarbon polymers so compounded that the polymer content thereof can be cured after being formed in the shape of a supported or unsupported filament or film. In the preparation of such a composition a dispersion of a chlorosulfonated hydrocarbon polymer is made and to that dispersion compounding and curing agents are added. It has not been possible heretofore to add successfully compounding agents to a dispersion of a polymer of ethylene (hereinafter the dispersion of the chlorosulfonated polymer of ethylene will sometimes be referred to as a latex). Applicant has discovered why such a mixture cannot be made and how to successfully prepare such a mixture that is stable.

In his study of the problem applicant found that dispersions of the chlorosulfonated hydrocarbon polymers became acidic and tended to approach at equilibrium a pH of about 2.2. The addition of curing and/or compounding agents to such a latex, either as a dispersion of those compounds or in other forms, invariably resulted in coagulation of the mixture. Applicant has discovered that if the latex is first made basic to a pH of greater than 7 and preferably between 8 and 11½ the compounding and curing agents can be added to give a compatible stable dispersion of the latex containing such agents. From such a compounded latex the dispersion can be laid down or otherwise formed as a film, the dispersing medium evaporated from that film and the polymer thereafter cured.

One of the preferred methods of preparing the compounded latex (hereinafter the latex containing compounding and curing agents will be referred to sometimes as compounded latex) is to first form a dispersion of the chlorosulfonated hydrocarbon polymer, make it basic and then add to it a dispersion of the well known metal oxide curing agents together with compounding agents for the chlorosulfonated hydrocarbon polymers. Not only can such addition be made in this manner without coagulation but also the compounded latex has a long shelf-life. From this composition films can be formed by flowing, spraying, brushing, dipping or by any other suitable method and the polymer content of those films cured by subjecting the film to suitable temperature and pressure conditions for evaporation and curing successively of the chlorosulfonated hydrocarbon polymer content thereof.

The latex may be prepared by any suitable process and is preferably prepared from an organic solution of a substituted, substantially saturated high molecular weight polymer from a monoolefin and particularly from the normally solid polymers of ethylene which have been chlorosulfonated, by emulsifying the solution in water containing suitable emulsifying and/or dispersing agents, subsequently removing the organic solvent from the emulsion to leave an aqueous dispersion of the solid polymer. The latex may also contain suitable sequestering agents with or without thickeners. This dispersion may then be subjected to further evaporation, if desired, to remove a portion of its water content and thereby concentrate the polymer content of the dispersion. The latex in this form is then made basic and the compounding and curing agents known to be effective for curing the polymer added thereto.

In general it has been found desirable in forming the compounded latex to prepare a dispersion of the compounding and curing agents prior to adding these agents to the basic latex. The addition can be made in the reverse order if desired. The dispersion of such agents may be prepared by any suitable process, one of which is by the use of the conventional ball milling technique in which the polyvalent metal oxide and other curing agents for the polymer are treated in water or in a colloid mill with a suitable amount of dispersing agent, protective colloid and a sequestering agent. Super-accelerators can also be added with the compounding agents, all of which are well known and have been used for the curing of the chlorosulfonated hydrocarbon polymers. These compounding agents are described in McAlevy et al. U.S. Patent 2,416,060, issued February 18, 1947. These agents described in that patent can be used in the dispersions herein described in the amounts prescribed by the patentees. Any other suitable method of preparing the dispersion of these compounding agents may be employed.

In order to prevent separation of the various ingredients from the film of the final composite latex, which may result in unequal curing, it is sometimes desirable to have thickeners present in the film to counteract any tendency of this nature. These thickeners may be added to the latex, to the dispersion of the compounding agents or to the compounded latex in order to give a film from which the ingredients will not separate.

While the latex is made principally from chlorosulfonated hydrocarbon polymers of ethylene and especially from those that are normally solid and contain from 0.4 to 3% sulfur and from 15 to 45% chlorine, other high molecular weight chlorosulfonated hydrocarbons may be used, such, for example, as those obtained from the polyisobutylenes, polypropylenes and the higher molecular weight olefins.

The examples which follow illustrate preferred embodiments of the invention in which parts are by weight unless otherwise stated.

A. *Preparation of a dispersion*

A chlorsulfonated polymer of ethylene containing 3% dispersing agent based on polymer was first prepared from these solutions:

Solution I— 100 parts of an 8% solution of a chlorosulfonated polymer of ethylene in $CCl_4$, containing 23 to 29% chlorine and 1.3 to 1.7% sulfur.
Solution II— 17.5 parts water.
1.0 part 25% solution of "Tergitol" Penetrant-4 (sodium salt of the half sulfuric acid ester of 2-methyl-7-ethyl-undecanol-4).

Solution II was added in toto to Solution I in a mixing or emulsifying device of any suitable type such as, for example, a Waring Blendor jar or mixing tank of a colloid mill. Mixing and/or recycling was started and maintained until uniformity of particle size was obtained. The emulsion was stripped under reduced pressure (about 50° C.) of organic solvent in a suitable apparatus such as a stirred vacuum kettle. Additional concentration of the latex may be accomplished by further evaporation of the water in the same apparatus. The concentration of the pure dispersing agent to the dry weight of the polymer was 3.2%. The latex can be concentrated up to about 70% solids. The particle size ranged up to 4 mcrons in diameter and the pH is 2.2.

B. *Preparation of water dispersions of compounding ingredients*

The ingredients were weighed out and dispersed by ball milling. A colloid mill or other suitable device, however, may be used.

1. 17.5% MgO:

| | Weight |
|---|---|
| MgO | 100 |
| Sorbitan monolaurate modified with ethylene oxide ("Tween" 20) | 10 |
| Casein (borax used as solubilizing agent—10% solution) | 30 |
| Water glass, $Na_2SiO_3$, 40° Bé | 6 |
| $H_2O$ | 420 |
| | 566 |

2. 44.5% PbO:

| | |
|---|---|
| PbO | 100 |
| 10% solution of polymerized sodium salts of alkyl phenyl sulfonic acid ("Darvan" #1) | 30 |
| 10% casein (borax as above) | 30 |
| Water glass | 10 |
| $H_2O$ | 55 |
| | 225 |

3. 50% tribasic lead maleate:

| | |
|---|---|
| Tribasic lead maleate | 100 |
| 10% "Darvan" #1 | 30 |
| 10% casein (borax as above) | 30 |
| Water glass | 10 |
| $H_2O$ | 30 |
| | 200 |

4. Natural rubber curing dispersion:

| | |
|---|---|
| Sulfur | 100 |
| Sym - di-beta-naphthyl-paraphenylene diamine ("Age Rite" white) | 100 |
| Zinc dibutyl-dithio carbamate (butyl zimate) | 100 |
| "Darvan" #1 | 12 |
| Casein (ammonia cut) | 12 |
| Caustic soda | 10 |
| Water | 266 |
| | 600 |

5. 55% MBTS (benzothiazyl disulfide):

| | |
|---|---|
| MBTS | 100 |
| 10% "Darvan" #1 | 40 |
| Bentonite | 1 |
| $H_2O$ | 41 |
| | 182 |

6. 33% DPG (diphenylguanidine):

| | |
|---|---|
| DPG | 100 |
| 10% "Darvan" #1 | 30 |
| 10% casein (borax) | 30 |
| $H_2O$ | 140 |
| | 300 |

7. 5% solution of methyl cellulose in water.

C. *Formation of compounded latex*

The latex of section A was made basic (pH 11.5) with a saturated solution of $Na_3PO_4$. The mixing was accomplished simply by mild agitation. After the latex of A was made basic the proper amounts of the aqueous dispersions of B were added, still under mild agitation, to give the following formulae based on dry weights of active ingredients listed:

| | I | II | III | IV |
|---|---|---|---|---|
| Chlorosulfonated polyethylene | 100 | 100 | 100 | 100 |
| Saturated $Na_3PO_4$ | (Sufficient to give a pH of 11.5) | | | |
| MgO (B-1) | 2.5 | | | |
| PbO (B-2) | | 10 | | |
| Tribasic lead maleate (B-3) | | | 10 | |
| Benzothiazyl disulfide (B-5) | 3 | 3 | 3 | 3 |
| Diphenylguanidine (B-6) | 1 | 1 | 1 | 1 |
| Methyl cellulose (B-7) | | | 2 | 1 |
| $Mg_3(PO_4)_2$ dispersion | | | | 10 |

D. *Film formation*

After complete mixing of the compounding ingredients a film was made by casting on glass or "Lucite" (polymeric methyl methacrylate) plates. The film was room temperature dried or dried in a circulating air oven at a temperature of about 90° C.

E. *Film curing*

Separate films were cured for 2 hours at 100° C., 30 minutes at 125° C. or 3 minutes at 150° C. in a steam autoclave.

F. *Properties of the cured film refer to compositions under C*

| | C-I | C-II | C-III | C-IV |
|---|---|---|---|---|
| Tensile Strength | 2,300 | 2,000 | 2,000 | 1,650 |
| Ult. Elongation | 600 | 475 | 650 | 650 |

G. *Formation of compounded latex with rubber latex compositions*

Ozone resistant blends of compounded latex with natural rubber latex were made from dispersions of the following compositions. Composition G-1 was made by the process described in the above examples. Composition G-2 was made by compounding a latex of natural rubber with dispersion B-4. G-1 and G-2 described below contain in addition to the ingredients listed, the other ingredients described above under the sections giving the preparation of the particular dispersion. In this section only the more active ingredients are listed. Their weight is given on a dry basis.

1.                                                          Weight
Chlorosulfonated polyethylene ------------------ 100
Saturated Na₃PO₄, to pH of 11.5.
PbO (B-2) --------------------------------------- 10
Benzothiazyl disulfide (B-5) --------------------- 3
Diphenylguanidine (B-6) ----------------------- 1
                                                              ———
                                                              114

2.
Natural rubber (latex) _____ 100
Sulfur
"Age Rite" White (B-4)  } _____ 3
Butyl zimate
                                                              ———
                                                              103

G-1 and G-2 latices were mixed to give latices having G-1/G-2 elastomer ratios of 100/0, 50/50, 25/75 and 0/100. Films were made and cured from each of these latices in accord with the methods described above and the cured films were exposed to the action of an atmosphere containing 150 p.p.m. of ozone in oxygen. The films from compositions containing G-1 and G-2 ratios of 100/0 and 50/50 showed no signs of cracking after 3½ hours exposure in this atmosphere. The film corresponding to ratio 25/75 cracked in 9 minutes while the compositions corresponding to ratio 0/100, which was natural rubber containing no chlorosulfonated hydrocarbon polymer, cracked after 2 minutes exposure.

The latex compositions may be rendered basic by the addition of a base although it has been found that optimum results are realized by the use of borax, trisodium phosphate, $Na_3PO_4$, tetrapotassium pyrophosphate, $K_4P_2O_7$, tetrasodium pyrophosphate, $K_4P_2O_7$, and the alkali metal hydroxides and carbonates.

Any suitable dispersing agent, protective colloid, or thickening agent may be present in the latex of the chlorosulfonated hydrocarbon polymer or the dispersed compounding agents. For dispersing the latex these dispersing agents are recommended—polyoxyethylene sorbitan monolaurate, polyoxyethylene sorbitan monoleate, dodecyl phenyl-polyglycol ether, the sodium salt of the ½ sulfuric acid ester 2-methyl-7-ethyl undecanol-4, high molecular weight carboxylic acid esters, alkyl aryl polyether alcohols and the sulfonated long chain alcohols. The dispersing agents should be used in amounts ranging from 2% to 10% by weight of the substituted polymer. Such thickening agents may be used as, for example, the polydioxolanes, partially hydrolyzed polyvinyl acetate, casein, methyl cellulose, natural colloids and the like. As little as possible of thickeners should be employed in order to reduce their effect on the final cured product but sufficient to give the desired result. The sequestering agents used in the preparation of the polyvalent metal oxide dispersions include, for example, sodium silicate, tetrapotassium pyrophosphate, sodium pyrophosphate and trisodium phosphate.

The sequestering effect is a function of the anion's ability to tie up PbO and MgO in such a manner that no $Pb^{++}$ or $Mg^{++}$ ions can be present and this prevents coagulation. The addition of sequestering agents to the latex alone should be sufficient to protect the latex against positive ion formation but upon mixing it is believed that (a) local high concentration of PbO or MgO is obtained upon addition of metal oxides, thereby producing instability and/or (b) the tie up or sequestering action is slow and positive ions upon addition of metal oxide are developed. As these sequestering agents are themselves basic in character they can be used as alkalizing agents. These agents should be employed to the extent of 2 to 10% based on the weight of the substituted polymer in order to provide a stabilized dispersion of the compounding agents and a long shelf-life for the compounded latex after combination of the latex with the dispersed compounding agents.

In the preparation of the latex applicant prefers to employ as the organic solvent for the substituted hydrocarbon polymer carbon tetrachloride or toluene although other suitable organic solvents may be used. In selecting the organic solvent it should be sufficiently stable during vacuum distillation to give a stable dispersion of the polymer in water when the solvent is removed by evaporation. Sufficient of the solvent should be employed to dissolve the chlorosulfonated hydrocarbon polymer, upon the evaporation of which that polymer remains as a dispersion in the aqueous solution.

In the formation of the latex compositions it is desirable that all of the organic solvent present be stripped from the dispersion since residual quantities of the solvent result in unstable dispersions. Vacuum evaporation is desirable to effect this result and may be continued beyond the time required for removal of all the organic solvent to decrease the water content of the latex.

The chlorosulfonated polymers of ethylene have an outstanding property of resisting the attack of ozone. The compounded latices of the invention are especially useful therefore in coating rubber and other materials subject to attack of ozone. They may be used by coating the article with the dispersion, evaporating the water therefrom and curing the polymer in situ. Alternatively and in order to provide dispersions that form coatings more compatible with rubber and synthetic elastomers generally, it has been found that a latex of rubber and the synthetic elastomers can be added to the latex of the chlorosulfonated polymers of ethylene prior to or subsequent to the addition of the dispersion of the compounding agents. When these compositions are reduced to a film and the polymer cured, an excellent ozone resisting film results. In forming these rubber containing latices the composite latex may be used over a wide range, from 0 up to 60% or more weight percent of the combined composite and rubber latices. In preparing such compositions there may be used, for example, rubber, copolymers of butadiene-styrene, isobutylene-isoprene, butadiene-acrylonitrile and polychloroprene and the like.

The compounded latex can be cast on glass plates, on the surface of a rotating polished drum, or deposited by dipping, coagulative dipping, electro deposition and the like on a suitable form, the water evaporated and continuous film stripped from the surface. This unsupported film can be cured by heat, with or without pressure, in any suitable manner. For example, it can be continuously passed through an oven. Usually complete curing is accomplished by heating for about 2 hours at 100° C. or for about 3 minutes in a steam heated oven, pressurized at 150 p.s.i. with steam or curing accomplished as described in the patents ibid. Supported films of the compounded polymer can be made in a similar manner. These films can be formed on any solid or flexible substrate such as wood, metal, plastic or the like.

The basic latex dispersions of the invention, that is, the dispersion of the chlorosulfonated polymers of ethylene which has been made basic, have utility in the textile coating field. In this field these dispersions when applied to fabrics give tough, resilient, water and weather resistant materials that retain such properties after repeated washings. These dispersions may likewise be used for paper coating, paper grease-proofing and clear protective coatings for rubber.

The compounded latex has a number of uses in which the cured chlorosulfonated hydrocarbon polymer has outstanding utility and especially those prepared from the normally solid polymers of ethylene having 0.4 to 3% sulfur and 15 and 45% chlorine. Examples of such uses include impregnation of wire braid, paper, fabrics, tarpaulins, awnings, belts, convertible top fabrics and the like; to improve weathering, flexing and durability as well as oil and grease resistance. These dispersions may also be used to improve the abrasion resistance of textile finishes, of paper and fiber-glass sizing compositions and likewise have utility in the preparation of non-woven fabric, for the impregnation by dipping of gloves, racks, toy dolls and the like. The dispersions can be used for coating purposes much in the same manner as paints and lacquers are applied to wood, masonry, metal and plastic surfaces to improve weathering and chemical resistance. The dispersions may likewise be coated on rubber articles, be used as adhesives and be blended with natural and synthetic elastomers to improve the ozone resistance of the latter. In the above and other uses the dispersion is applied in any suitable manner as has been described, the dispersant removed by evaporation and the polymer then cured, preferably by the application of heat and pressure.

Moreover, the films produced may be used per se unsupported or may be supported on any type of flexible or inflexible substrate such as paper, rubber; a sheet metal such as tin, lead, aluminum; a cellulose derivative such as cellulose acetate, nitrate or ether or mixtures thereof or mixed organic and/or inorganic cellulose derivatives, or regenerated cellulose or the like. They may be used to provide moisture-proofing, abrasion resistance and/or weather resistance.

I claim:

1. A process for producing a cured chlorosulfonated polymonoolefin which comprises forming an aqueous latex of a chlorosulfonated polymonoolefin having an average particle size of less than 4 microns, making that latex basic to a pH of about 8 to about 11.5, adding to the resulting basic latex a dispersion of a polyvalent metal oxide which is a curing agent for the chlorosulfonated polymonoolefin, evaporating the water from the basic latex, and thereafter curing the chlorosulfonated polymonoolefin by heating it at a temperature of 100° C. to about 150° C.

2. The process of claim 1 in which the chlorosulfonated polymonoolefin is a chlorosulfonated normally solid polyethylene.

3. A process for producing a cured unsupported continuous film of a chlorosulfonated polymonoolefin which comprises forming an aqueous latex of the chlorosulfonated polymonoolefin having an average particle size of less than 4 microns, making that latex basic to a pH of about 8 to about 11.5, combining the resulting basic latex with a dispersion of a polyvalent metal oxide which is a curing agent for the chlorosulfonated polymonoolefin coating the resulting compounded basic latex over a surface to form a continuous film, evaporating the water from the film, curing the film by heating it at a temperature of 100° C. to about 150° C., and then removing the cured film from said surface.

4. The process of claim 3 in which the chlorosulfonated monoolefin is a chlorosulfonated normally solid polyethylene containing from 0.4% to 3% sulfur and 15% to 45% chlorine.

5. A process for producing a cured supported film of a chlorosulfonated normally solid polyethylene which comprises forming an aqueous latex of a chlorosulfonated normally solid polyethylene having an average particle size of less than 4 microns, making that latex basic to a pH of 8 to 11.5, adding to the resulting basic latex a dispersion of a polyvalent metal oxide which is a curing agent for the chlorosulfonated polyethylene together with compounding agents for the chlorosulfonated polyethylene, depositing the resulting compounded basic latex on a flexible substrate, evaporating the water from the latex, and then curing the chlorosulfonated polyethylene by heating it at a temperature of 100° C. to about 150° C.

6. An aqueous dispersion of a chlorosulfonated normally solid polyethylene in which the chlorosulfonated polyethylene has a sulfur content between 0.4% and 3%, a chlorine content between 15% and 45%, and an average particle size of less than 4 microns, and the dispersion has a pH of about 8 to about 11.5.

7. An aqueous dispersion containing a chlorosulfonated polymonoolefin and a polyvalent metal oxide which is a curing agent for the chlorosulfonated polymonoolefin, the dispersion having a pH about 8 to about 11.5 and the chlorosulfonated polymonoolefin having an average particle size of less than 4 microns.

8. The dispersion of claim 7 in which the chlorosulfonated polymonoolefin is a chlorosulfonated normally solid polyethylene having a sulfur content between 0.4% and 3% and a chlorine content between 15% and 45%.

9. An aqueous dispersion containing a dispersed curable chlorosulfonated polymonoolefin having an average particle size of less than 4 microns, a dispersed polyvalent metal oxide which is a curing agent for the chlorosulfonated polymonoolefin, and a dispersed elastomer of the group consisting of rubber and copolymers of butadiene-styrene, isobutylene-isoprene, butadiene-acrylonitrile, and polychloroprene, the dispersion having a pH of about 8 to about 11.5.

10. The dispersion of claim 9 in which the chlorosulfonated polymonoolefin is a chlorosulfonated normally solid polyethylene having a sulfur content between 0.4% and 3% and a chlorine content between 15% and 45%.

References Cited in the file of this patent

UNITED STATES PATENTS 2,562,119   Haon _____ July 24, 1951

OTHER REFERENCES

Noble: "Latex in Industry," pages 59, 178, 179, 184 (2nd edition), Palmerton Publishing Co., Inc. (1953).

Webster's New International Dictionary (2nd edition), Merriam-Webster, page 1397.

"Thiokol," page 1 (general information on "Thiokol Latices"), Thiokol Corporation, Trenton 7, N.J., revised July 30, 1947.